Aug. 21, 1956 R. B. ATKINSON 2,759,824
METHOD OF PHOTOGRAPHIC PROCESSING AND DEVELOPER THEREFOR
Filed May 18, 1954
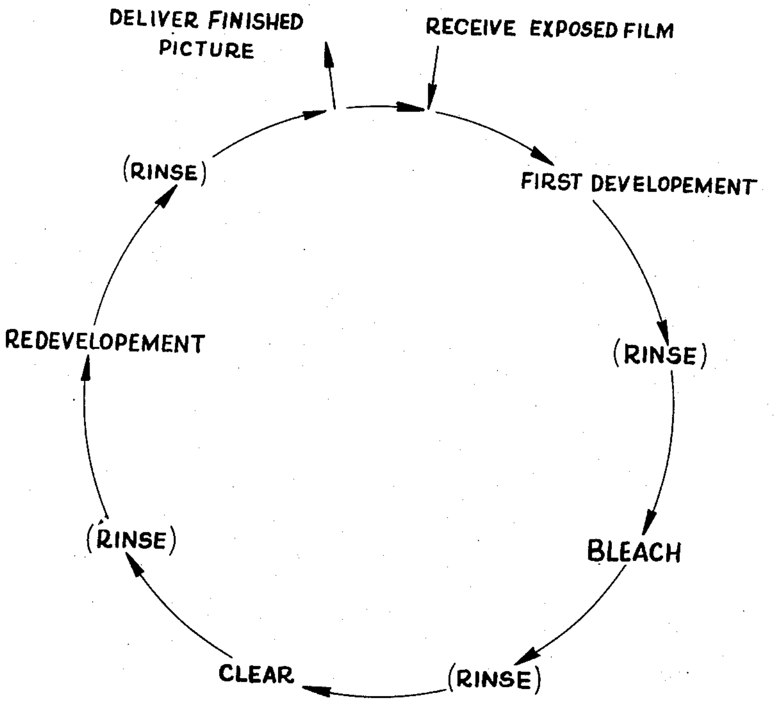
INVENTOR.
RALPH B. ATKINSON
BY Fulwider Mattingly & Babcock
Attorneys United States Patent Office 2,759,824

Patented Aug. 21, 1956

2,759,824

METHOD OF PHOTOGRAPHIC PROCESSING AND DEVELOPER THEREFOR

Ralph B. Atkinson, Beverly Hills, Calif.

Application May 18, 1954, Serial No. 430,473

3 Claims. (Cl. 95—88)

My invention relates generally to photographic processing and more particularly to the processing of photographic images by what is known as the "reversal process," and specifically is concerned with repetitive cycles of reversal processing.

The customary photographic procedure includes the exposure of a light sensitive material, and the development and fixing of that material, thereby producing a negative image. Thereafter, a second photosensitive material is exposed through the negative and the second is then developed and fixed to obtain a positive photograph. In many instances, it is desirable to shorten this process, and consequently a system known as reversal processing is used to obtain what is known as a "direct positive" or a "reversal positive." In this process, the photosensitive material is exposed and developed, and instead of being fixed, is chemically bleached to remove the metallic silver, cleared by a suitable solution, and the remaining light sensitive salts are then re-exposed to light and the photosensitive material is again developed, this time producing a positive image. This method of reversal processing has the disadvantage that it requires the exposure of the film to light after it has been bleached and before it has been developed the second time, and this presents mechanical problems where all of the processing is carried out within a single compartment.

Thus, in many photographic devices, a picture is taken by exposing a piece of sensitized paper, whereupon the paper, in an appropriate carrier, is first immersed in a developer, then bleached, cleared, re-exposed to light, and finally redeveloped, after which it is dried and delivered to the customer in a matter of a very few minutes. Machines for performing this process are often found in amusement parks and similar areas, and preferably, for the greatest flexibility, should be capable of operation without requiring supplies of water for rinsing, nor sewer connections. Additionally, the machine should not be one that produces an objectionable odor, since adequate ventilation cannot always be provided.

An attempt has been made to remove the difficulties dependent upon the use of light to re-expose the partially treated photograph, and one method of accomplishing this is by the provision of a second developer which will spontaneously develop the positive image, using a so-called "fogging" second developer. As an example, a solution containing a sulphide ion, e. g., a 2 percent solution of sodium sulphide, has been used for this purpose. Thus, after a film or other photosensitive material has been exposed and developed to a negative, it is bleached and cleared in the customary manner, and at that point contains unexposed sensitive silver salts. By immersing this film in the sulphide solution, the salts are converted to a dark silver compound, silver sulphide, giving a positive image.

However, this process has a number of disadvantages. In the first place, the sulphide solution causes production of hydrogen sulphide gas that has a very unpleasant and repelling odor. Furthermore, this gas is very likely to fog the unexposed film stored in the machine.

Another objection to the use of the sulphide solution is found in the automatic machines in which the film or photosensitive material is carried in a holder that is progressively immersed in the different solutions and after the completion of the cycle, is returned to receive a fresh film and thereafter repeat the cycle. In such cases, the sulphide solution that adheres to the frame will be carried into the first developer and contaminate it so that fogging will occur during the first development.

It is therefore a major object of my invention to provide a method of processing photographic materials by the reversal process in such a manner that the solutions used in such a process do not become contaminated in use, and to provide the necessary solutions for practicing this method.

Another object of my invention is to provide such a method and the solutions therefor that do not cause the release of disagreeable odors, either during the operation of the processing, or upon mere standing.

It is a further object of my invention to provide such a method and materials that do not cause the release of gases or vapors that would fog or contaminate the unexposed film stored within the machine.

Still another object of my invention is to provide a method and materials particularly adapted for use in automatic machines of the type heretofore described.

It is a still further object of my invention to provide a developer containing an anti-contaminant that acts to prevent any of the material carried from the second or re-developer solution from adversely affecting the operation of the first developer.

These and other objects and advantages of my invention will become apparent from the following description of a preferred method of performing the operations and of a preferred form of treating solutions, and from the drawing illustrating that method in which:

The single figure is a diagram indicating the cycle of operations and processing in the treatment of an exposed film in an automatic photofinishing machine of the type described.

As previously indicated, the use of a fogging-type of re-developer is desirable in that it simplifies the construction and operation of the equipment. However, if contamination of the first developer is to be eliminated, the re-developer must be neutralized, or rendered ineffective, either by some action prior to the time that the holder is again placed in the first developer, or by some action within the first developer. Often, it is not practical to treat the film holder or the re-developer so that the first developer will not be contaminated, and consequently, it is necessary to select a re-developer whose action can be neutralized by certain chemicals within the first developer, while the remaining chemicals therein act in their normal manner to provide the requisite first development.

Thus, a "fogging" re-developer of the sulphide or thiourea type soon contaminates the first developer, rendering it useless before its normal life is exhausted. However, this can be prevented by the addition of one or more substances to the first developer which will react with the contaminating compound, either precipitating it from solution, or otherwise rendering it inactive as a fogging agent. Such anti-contaminant may also be added to the water rinses through which the film and film holding device pass, between the re-developer and the first developer.

I have found that the well known anti-fogging agents, benzotriazole and 6-nitro benzimidazole, cannot be added to the first developer in a quantity sufficient to prevent spontaneous development without seriously decreasing the effective speed of the developer. It has long been thought that the presence of certain metallic ions, such as copper, is incompatible with the proper developing action, whether these ions be in the first developer or in any comparable developer which selectively acts upon silver salt crystals that have previously been exposed to light and does not act upon unexposed crystals. However, I have found that the presence of certain metallic ions is not necessarily fatal to good results and when these ions are present in the first developer, they will react with either the sulphide or thiourea of the re-developer and render them inert insofar as their fogging effect is concerned. The particular metallic ion selected must have a certain minimum solubility in an alkaline developing solution, and it must form an undissociated or insoluble complex with either the thiourea or sulphide ion. Such ions preferably are obtained from suitable salts of certain metals, including silver, mercury, lead, copper, cadmium, tin, and zinc.

A soluble salt of one of the mentioned cations, for example lead acetate, is added to the rinsing bath in which the film and its holder is immersed subsequent to the re-development procedure, and prior to the re-immersion of the holder in the first developer. Alternatively, the salt or anti-contaminant may be added to the first developer alone, and in practice it is generally simpler and more convenient to add it to this first developer.

With the anti-contaminant in the rinse or in the first developer, the cation of the anti-contaminant combines with the sulphide ion or thiourea to form a relatively insoluble or undissociated compound or complex, which, since the anions thereof are unavailable, can no longer spontaneously fog or develop the film. While the relatively insoluble compound or complex formed may be slightly soluble, to the extent that a few anions may be present, by having an excess of the necessary cations, the desired results are obtained.

As examples of my preferred form of first developer, I may use one of the following formulas, which are a conventional first developer to which has been added a soluble salt of the previously mentioned cations in sufficient concentration to prevent spontaneous development or fogging:

| Formula I | | | Formula II |
|---|---|---|---|
| Hydroquinone | gram | 22.5 | 22.5 |
| Sodium Sulphite | do | 30.0 | 30.0 |
| Sodium Hydroxide | do | 22.5 | 22.5 |
| Boric Acid | do | 5.0 | 5.0 |
| Potassium Bromide | do | 5.0 | 5.0 |
| Aqua Ammonia (22%) | ml | 5.0 | 5.0 |
| Lead acetate | gram | 0.25 | ---------- |
| Copper Sulphate | do | ---------- | 2.0 |
| Water to make | liter | 1.0 | 1.0 |

It will be seen that with the exception of the lead acetate in Formula I and the copper sulphate in Formula II, the developers are the same, and are conventional. The anti-contaminant that has been added to each of them is sufficient to neutralize or render ineffective any of the re-developer that may be carried into the first developer, thereby preventing spontaneous development, while at the same time, the anti-contaminant is not present in sufficient quantity to seriously alter the desirable characteristics of the first developer. Although the amount of anti-contaminant employed according to my invention may be varied, I prefer to use an amount ranging between 0.1 and 2.5 grams per liter of solution.

After the film has been developed in the conventional manner in this first developer solution, thus forming a photographic negative, it is bleached in a conventional bleaching solution, which may consist of a solution of potassium dichromate and sulphuric acid, this solution being well known and widely used in the art. Thereafter, the film is placed in a clearing solution, which may be a solution of sodium sulphite, and then re-developed to a positive image in a suitable re-developer.

While various re-developers may be used, and while a solution of sodium sulphide has been suggested, it has also been noted that this produces an objectionable odor. Consequently, I prefer to use an alkaline solution of thiourea. An example of such a re-developer is as follows:

Re-developer

| | | |
|---|---|---|
| Thiourea | gram | 10–100 |
| Sodium Hydroxide | do | 10–100 |
| Water to make | liter | 1.0 |

The re-developer given above acts spontaneously without requiring the re-exposure of the film to light, has no odor, acts quickly, and is less troublesome in causing spontaneous development or fog in the first developer. It will be appreciated, of course, that other alkalies or bases may be used instead of sodium hydroxide, as for example, potassium hydroxide.

It will be realized that in the case of automatic machines of the type described, where an exposure is made on a photosensitive material, the photosensitive material may be of the type generally known as film, or may be on a paper base. Consequently, while I have used the term "film" in the description of my preferred process and solutions, it is to be understood that it is used in a broad sense in the specification and claims to include a photosensitive emulsion on a suitable base or carrier, whether this base or carrier be paper, a plastic, glass, metal, etc. Likewise, while the automatic machine has been briefly described as performing certain operations in a definite sequence, these are given by way of example only, and not as a limitation. In each case, the important considerations are the provision of a redeveloper that acts spontaneously without requiring re-exposure of the film to light, and one that preferably has no odor, and does not release gases that tend to fog unexposed or partially processed film within the machine. Likewise, the redeveloper should be one that can be neutralized by appropriate materials added to the first developer, and the first developer should include such a neutralizing or anti-contaminant agent of the type that will be effective upon any of the re-developer that is carried into the first developer solution while not adversely affecting the action of that first developer.

From the foregoing, it will be seen that I have shown and described a method and materials for use with that method that are fully capable of achieving the objects and securing the advantages heretofore set forth. While I have shown and described a preferred embodiment, it will be appreciated that changes will be made therein without departing from the broad scope of my invention. Consequently I do not wish to be restricted to the particular sequence of operations or the particular chemicals used, except as limited by my claims.

I claim:

1. In the cyclical process of producing a reversed photographic image in a light sensitive silver halide-containing film and wherein said film is exposed and positioned on a movable carrier and subjected first to development in a developing solution and then, after removal of the initially developed silver, to re-development of the residual silver halide in a re-developing solution including a soluble sulfur-containing re-developing agent, and the resulting film is ejected from the carrier and a succeeding exposed light sensitive silver halide-containing film is positioned on said carrier for processing in the aforesaid manner, and wherein said carrier is placed in contact with said re-developing solution and said developing solution, the improvement for preventing contamination of said developing solution by contact thereof with said re-developing agent which may be carried into said developing solution by said carrier, which comprises introducing said carrier into a solution containing an anti-contaminant at a stage following contact of said carrier with said re-developing solution and not later than succeeding contact of said carrier with said developing solution for developing said succeeding film, said anti-contaminant reacting with said re-developing agent to form a substance which is substantially inert in said developing solution, said anti-contaminant being a soluble salt producing in solution cations of a metal of the group consisting of silver, mercury, lead, copper, cadmium, tin and zinc; and said re-developing agent being a member of the group consisting of a soluble alkali metal sulfide and thiourea.

2. A process as defined in claim 1, wherein a soluble lead salt is incorporated in said developing solution and an alkaline solution containing thiourea is employed as the re-developing solution.

3. A process as defined in claim 1, wherein a soluble copper salt is incorporated in said developing solution and an alkaline solution containing thiourea is employed as the re-developing solution.

References Cited in the file of this patent

UNITED STATES PATENTS

| | | |
|---|---|---|
| 2,466,423 | Henn et al. | Apr. 5, 1949 |
| 2,584,030 | Land | Jan. 29, 1952 |
| 2,656,273 | Henn | Oct. 20, 1953 |

FOREIGN PATENTS

| | | |
|---|---|---|
| 525,944 | Great Britain | Sept. 6, 1940 |

OTHER REFERENCES

Clerc: "Photography, Theory and Practice," Pitman, N. Y., pp. 302–304, 380–381, 268–269.

Clerc: "Photography, Theory and Practice," Pitman, N. Y.. 3rd Edition. 332–333. 430–431. (Copy in Div. 67.)